US 6,668,710 B2

(12) United States Patent
Catelli et al.

(10) Patent No.: US 6,668,710 B2
(45) Date of Patent: Dec. 30, 2003

(54) VARIABLE-TRIM FOOD REFINER

(75) Inventors: Roberto Catelli, Parma (IT); Mario Gozzi, Parma (IT)

(73) Assignee: Rossi & Catelli S.p.A., Parma (IT)

( * ) Notice: Subject to any disclaimer, the term of this patent is extended or adjusted under 35 U.S.C. 154(b) by 58 days.

(21) Appl. No.: 10/032,483

(22) Filed: Jan. 2, 2002

(65) Prior Publication Data

US 2002/0195507 A1 Dec. 26, 2002

(30) Foreign Application Priority Data

Jun. 21, 2001 (IT) .................................... MO2001A0129

(51) Int. Cl.[7] .............................. A23N 1/00; B30B 9/20
(52) U.S. Cl. ............................ 99/513; 99/510; 100/127
(58) Field of Search .................... 99/513, 510, 495; 241/74, 89, 89.3, 100, 286, 287; 100/117, 125, 127, 116

(56) References Cited

U.S. PATENT DOCUMENTS

| | | | |
|---|---|---|---|
| 2,101,620 A | * 12/1937 | Lewis | 99/513 |
| 2,172,790 A | * 9/1939 | Ferrari et al. | 99/513 |
| 4,518,621 A | * 5/1985 | Alexander | 100/117 X |
| 5,598,772 A | * 2/1997 | Catelli | 99/510 |

* cited by examiner

Primary Examiner—Reginald L. Alexander
(74) Attorney, Agent, or Firm—Browdy and Neimark, P.L.L.C.

(57) ABSTRACT

The food refiner comprises a sieve, provided with an inlet for a produce to be processed and an outlet for a waste product, at a center of which a rotor extends from the inlet to the outlet and bears a plurality of spatulas which interact with an internal surface of the sieve, and a casing which surrounds the sieve and which is provided with an outlet mouth for extracted product. The spatulas can be oriented contemporaneously and with different orientations with respect to an axial direction of the rotor which, for this purpose, comprises an external jacket and an internal jacket which can, on command, translate relatively to each other so as to cause a positioning of the spatulas, made possible by a guided rotatable coupling of the spatulas in relation to the rotor.

18 Claims, 3 Drawing Sheets

VARIABLE-TRIM FOOD REFINER

BACKGROUND OF THE INVENTION

Food refiners are usually applied in the food conserves industry for separating fruit or vegetable juice or pulp from skins or peel, seeds and other waste present in the produce.

Reference is made in particular to a food refiner of a type comprising a fixed tubular sieve having an inlet for the produce to be treated and a discharge for the waste product, at the centre of which, and stretching from inlet to outlet, there is a rotor driven by a commandable rotatable shaft. The rotor radially bears a plurality of blades, each of which has one end which is very close to the surface of the sieve and causes the produce to move both in a centrifugal direction, pressing the produce against the sieve, and in an advancement direction towards the discharge, whereat the waste product exits. For this purpose the blades have a slightly inclined orientation with respect to the rotor axis. A casing is also provided, which surrounds the sieve and exhibits an outlet mouth for the refined product that has passed through the sieve and is then extracted from the food refiner.

Devices of this type exist in the prior art: one example is described in Italian Patent no. 67132A/77.

In order to be able to treat various produce, with equally varying consistency and fluidity, known food refiners usually operate by modifying the number of rotations of the rotor; this is not an entirely satisfactory system since it is not always possible, and never easy, to arrive at a number of rotations which on the one hand prevents a production of damp waste (meaning a waste of juice) and on the other avoids a too-energetic action which leads to deterioration in the quality of the final product.

A further drawback of the known food refiners is represented by the fact that the sieve and the blades exhibit different degrees of wear at various points thereof. The sieve tends to wear worse at its initial tract, and its holes tend to wear all on one side. The blades wear all on the one side too. This means that sieve and blades have to be substituted when only partially worn.

SUMMARY OF THE INVENTION

The main aim of the invention is to obviate the above-described drawbacks in the prior art, by providing a food refiner which gives an optimum treatment of the various types of produce used as well as enabling a longest-possible working life to be obtained of the parts most subject to wear, i.e. the sieve and the blades.

An advantage of the invention is that it acts differently on the produce in various zones of the food refiner itself, and can be commanded to change its working settings according to need and type of produce.

These aims and advantages and others besides are all achieved by the present invention, as it is characterised in the claims that follow.

BRIEF DESCRIPTION OF THE DRAWINGS

Further advantages of the present invention will better emerge from the detailed description that follows of a preferred but non-exclusive embodiment of the invention, illustrated purely by way of non-limiting example in the accompanying figures of the drawings, in which.

DESCRIPTION OF THE PREFERRED EMBODIMENTS

Figure 1:
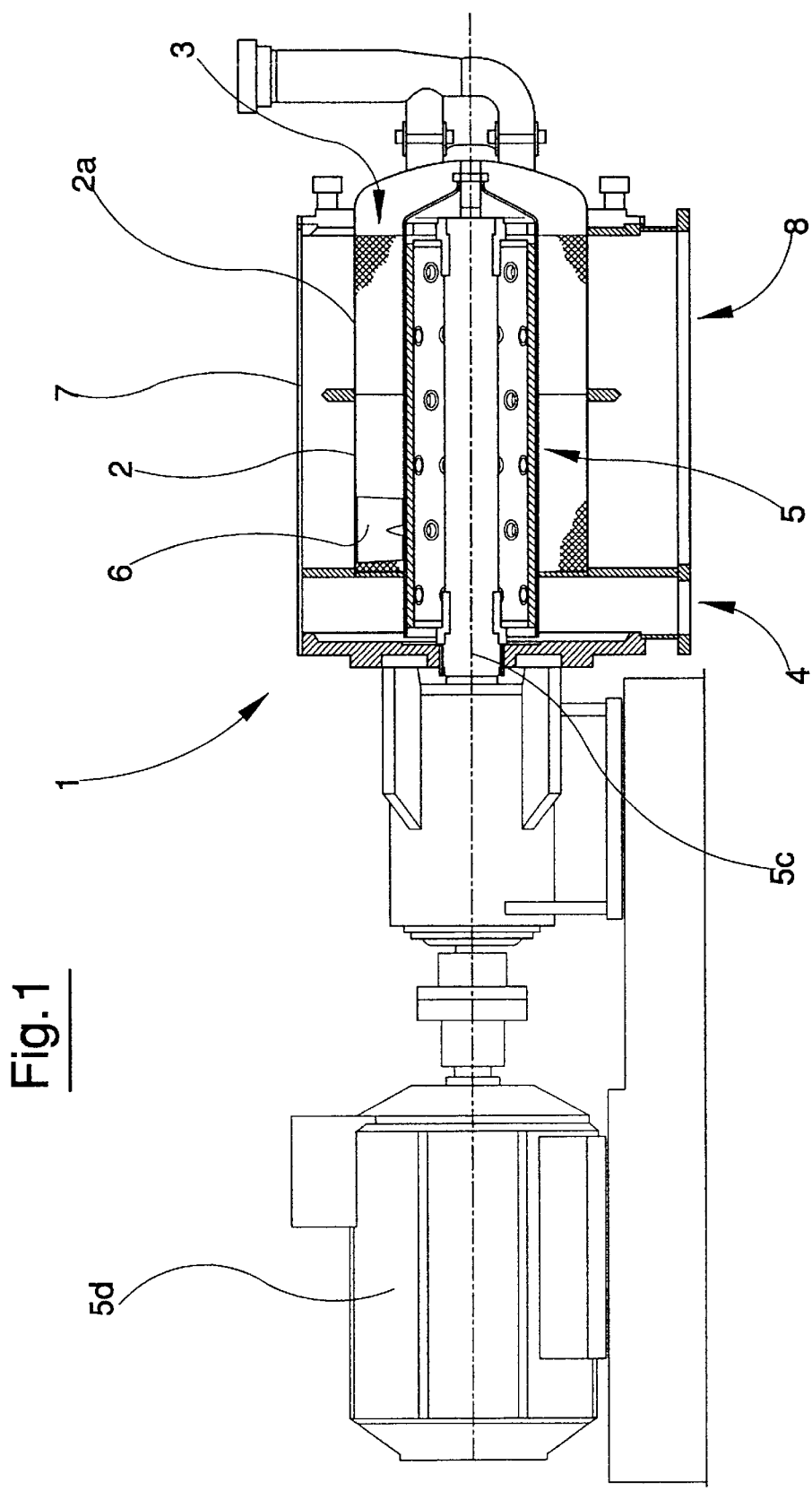
FIG. 1 is a schematic view in vertical elevation, with some parts in section, of the food refiner of the invention.
Figure 2:
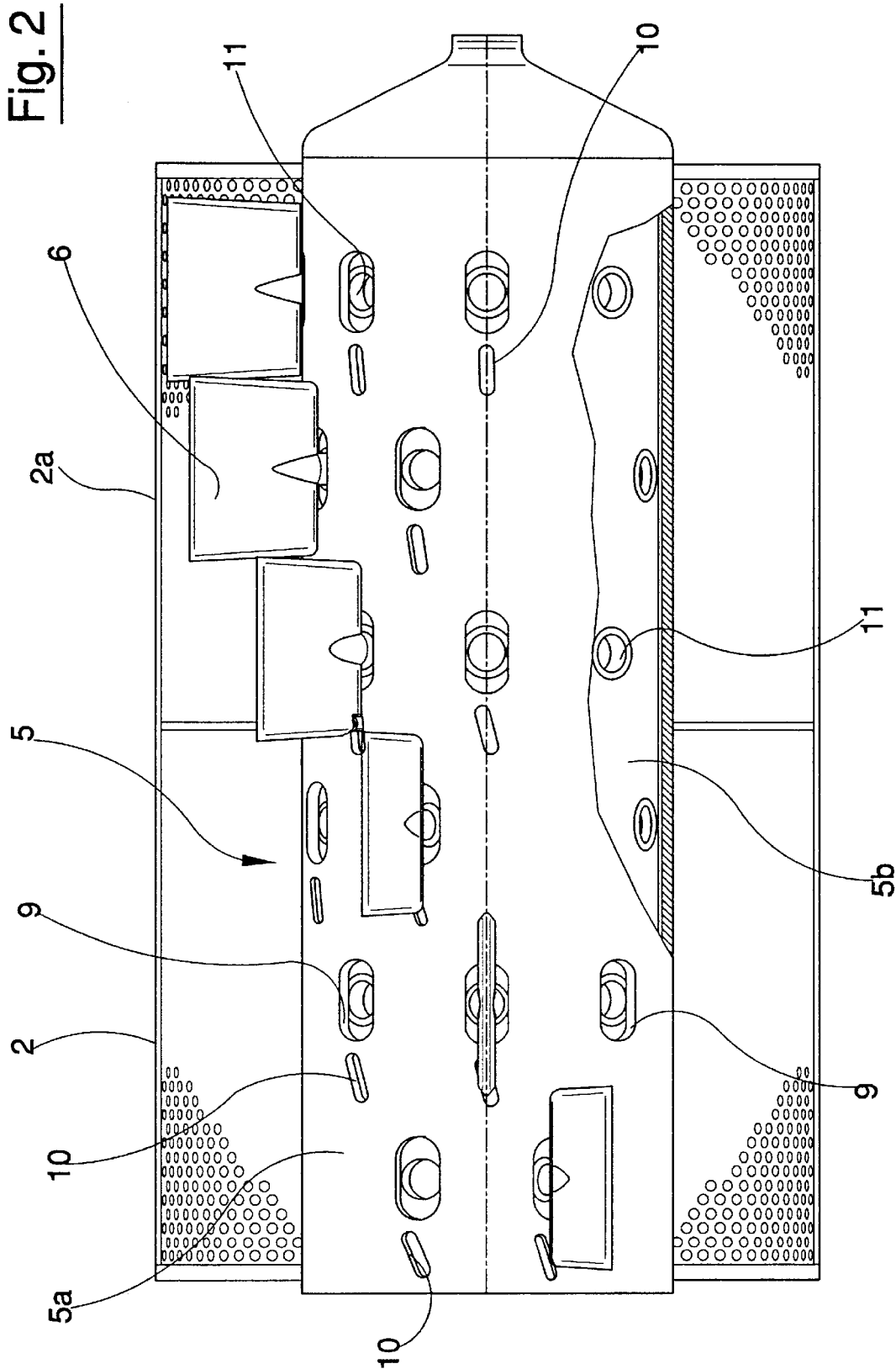
FIG. 2 is a lateral view of the rotor of the food refiner inserted in the sieve, with some parts removed better to evidence others, and with the sieve shown in section.
Figure 3:
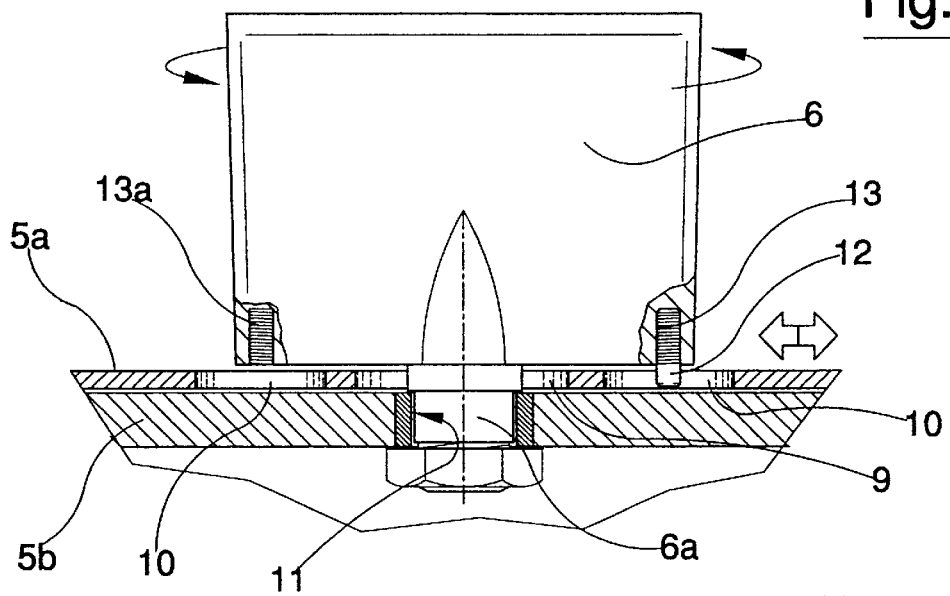
FIG. 3 shows, in enlarged scale, a section of a detail of the connection of a blade to the rotor.

With reference to the figures of the drawings, 1 denotes in its entirety a food refiner for extracting juice or pulp from food produce, which comprises a sieve 2, 2a provided with an inlet 3 for the produce to be processed and an outlet 4 for the waste product.

A rotor 5 extends from the inlet 3 to the outlet 4 and is commandably powered by a drive shaft 5c turned by a motor 5d. The rotor 5 bears, on a lateral surface thereof, a plurality of blades 6, each of which extends from the rotor 5 very close to an internal surface of the sieve 2.

A casing 7, surrounding the sieve 2, exhibits an outlet mouth 8 for the processed product.

As shown in FIGS. 3–6, the rotor 5, generally cylindrical in shape (though truncoconical shapes would be possible) comprises an external jacket 5a which is provided with a plurality of slots 9 arranged with a longitudinal aspect thereof in line with an axial direction of the rotor 5. A further series of slots is made in the external jacket 5a, which slots are intended as guide holes 10 and will be more fully explained herein below.

The rotor 5 further comprises an internal jacket 5b which is solidly constrained in rotation with the external jacket 5a. The external jacket 5a can be moved axially with respect to the internal jacket 5b. In a possible embodiment, means for moving the external jacket 5a comprise a threaded ring nut, coaxial to the drive shaft 5c which by screwing and unscrewing imparts axial movement on the external jacket 5a in both axial directions. The ring nut could, however, be replaced by other equivalent means. Also, this relative translation between the two jackets 5a and 5b could be obtained by moving the internal jacket 5b, in which case the external jacket 5a would remain fixed.

The internal jacket 5b is provided with a plurality of through-holes 11, each of which is located in correspondence with one of the slots 9; the through-holes 11 and the slots 9 are reciprocally arranged so that, following a translation of the external jacket 5a with respect to the internal jacket 5b, the through-holes 11 can slide the whole length of the slots 9.

The spatulas 6 are connected to the rotor 5 and develop mostly in an axial direction to the rotor 5, or, as will better emerge herein below, in slightly inclined planes with respect to the axial planes of the rotor 5.

Each spatula comprises, at an end thereof connected to the rotor 5, a rotation pivot 6a which is inserted in one of the slots 9 and is snugly and rotatably fixed idle in an underlying through-hole 11 in the internal jacket 5b. The snug fitting is easily achieved using nuts (as illustrated) or elastic seal-rings. Each of the spatulas 6 further comprises a guide pivot 12 connected at a lateral extremity of the spatula 6 and facing towards the rotor 5. This connection is generally obtained by screwing into a threaded hole 13, 13a afforded in the spatula 6. Thus a threaded end of the guide pivot 12 is removably fixed to the spatula 6 while another end of the guide pivot 12 exits from the spatula 6 in the direction of the rotor 5. The guide pivot 12, or, more precisely, the end of the guide pivot 12 that projects from the spatula 6 in the direction of the rotor 5, inserts in one of the guide holes 10 and can slide therein. The guide holes 10 are arranged, relatively to each pair of through-holes 11 and slots 9, in a position which enables both insertion and sliding of the guide pivots 12 in the guide holes 10. The sliding is consequent to a translation of the external jacket 5*a* of the rotor 5.

Obviously, in order to enable a correct guide of the guide pivots 12, the diameter of the guide pivots 12 must be about the same as the guide holes 10, with just sufficient play to avoid jamming or sticking during guide pivot 12 movement. The guide holes 10 constitute a guided run for the guide pivots 12, in which the guide pivots 12 move with no lateral displacement.

Two threaded holes 13 and 13*a* are provided, one at each lateral extremity of the spatula 6, to make sure the spatula 6 is symmetrical with respect to an axis of rotation thereof; the spatula 6 itself is also symmetrically shaped with respect to the axis of rotation thereof. The guide pivot 12 can be fixed to either of the threaded holes 13 and 13*a*.

The guide holes 10 can be arranged anteriorly or posteriorly (or in both positions so as to enable use of one or the other guide holes 10) with respect to a relative pair of through-holes 11 and slots 9.

Each guide hole 10 is specially inclined and shaped so as to guide a relative guide pivot 12 along a predetermined run. The run of the guide pivots 12 (or at least some of them) can be changed easily by locating some of the guide holes 10 on removable parts of the external jacket 5*a*. Thus it is possible to remove a part of the external jacket 5*a* and replace it with another which affords a guide hole 10 having a different inclination or shape. Differently to what is illustrated, the removable part of the external jacket 5*a* can be represented by a sector or an annular crown comprising a plurality of guide holes 10.

For reasons which will be better explained herein below, the sieve 2 of the food refiner is sub-divided into two parts, respectively 2 and 2*a*, which are exactly the same.

From a general point of view, the operation of the food refiner is similar to that of known food refiners. Produce to be processed enters the inlet 3 and proceeds into an annular crown area situated between the sieve 2 and the rotor 5 bearing the spatulas 6 which are slightly inclined with respect to an axial plane of the rotor 5, which are solid in rotation with the rotor 5 and which have one end which is very close to an internal surface of the sieve 2. Obviously a distance of the end of the spatula from the surface of the sieve 2 and an inclination of the spatula 6 are such as not to create any interference between the end of the spatula 6 and the internal surface of the sieve 2.

Following a rotation of the rotor 5 the spatulas 6 impress a centrifugal motion on the produce to be treated which compresses the produce against the sieve 2 and causes the juice and pulp of the produce to pass through the sieve 2. The inclination of the spatulas with respect to the axial planes of the rotor 5 causes the produce which has not passed through the sieve 2 to advance towards the subsequent sections of the sieve 2 so that the refining process is continued. At the end of the annular crown extending between the sieve 2 and the rotor 5, only the waste product remains of the original produce, which waste product exits through the outlet 4.

The refined product exiting from the sieve 2 is collected in the casing 7 surrounding the sieve 2 and exits from the food refiner through the exit mouth 8.

During operation, the spatulas 6, as in known-type food refiners, are fixed with respect to the rotor 5 and operate on the produce as described above. This operating mode leads, as in known food refiners, to problems of uneven wear of the sieve 2, as noted in the introductory part of the present description. The sieve 2 tends to wear more quickly in an initial part thereof, which is the part that processes the greatest amount of produce. The holes in the sieve 2 too tend to get worn at the same part; if the spatulas 6 rotate in a clockwise direction, the holes in the sieve 2 tend to wear more at right sides thereof, as it is the right sides which more directly bear the brunt of the flow of produce. For the same reasons, the spatulas 6 also tend to wear more quickly on upper right sides thereof. In known food refiners, the sieve 2 and the spatulas 6 must therefore be replaced when they exhibit wear on only parts thereof.

The other drawback noted in the introduction to the present description related to when produce of different types are to be processed, i.e. produce having different fluidities. In known-type food refiners it often happens that the exiting waste product is excessively humid, with a consequent loss of product; or the opposite happens, with a too-energetic processing of the produce leading to damage to the product's quality, with black specks or other types of waste possibly crossing the sieve and passing into the refined product.

All of these drawbacks are obviated, or in any case considerably reduced, by the food refiner of the invention. If a different produce is to be processed, the spatulas of the food refiner can be oriented differently so that the greater or reduced fluidity of the produce can be accommodated by creating a prevalence of centrifuge component in the processing, or a prevalence of advancement component imparted on the produce by the spatulas. It is also possible to re-orient the spatulas only in a particular sector of the food refiner so as to increase or reduce in that particular sector the friction of the produce against the sieve internal wall, thus reducing wear thereon. The spatula inclination can even be inverted with respect to the axial plane; in this way, by contemporaneously inverting the rotation direction of the motor, the produce can be pushed against the sieve 2 from the opposite side to before, thus balancing wear on the right and left sides of the holes of the sieve.

In the food refiner of the invention, variation in the orientation of the spatulas is obtained very easily, by translating the external jacket 5*a* with respect to the internal jacket 5*b*. This translation causes a rotation pivot 6*a* to slide in a relative slot 9 while the guide pivot 12 is guided to slide in a relative guide 10, following the shape of the guide 10 and thus causing a desired rotation of the spatula 6, bringing it into its new position.

The translation of the external jacket 6*a* of the rotor with respect to the internal jacket 6*b* causes a simultaneous change in orientation of all of the spatulas 6, while the new orientation of each single spatula 6 will be determined by the shape of the relative guide 10. Obviously by providing specially-shaped guides 10, different degrees of translation of the external jacket 6*a* will lead to various orientations of the spatulas, groups of spatulas or single spatulas; the only limit to the number of variations possible is constituted by the necessity of preventing jamming of the guide pivots 12 in the guides 10 on the one hand and by avoiding an excessive angulation of the spatulas 6 (which would be of little practical use anyway) which might lead to a risk of interference between the spatulas and the internal surface of the sieve 2.

Figure 4:
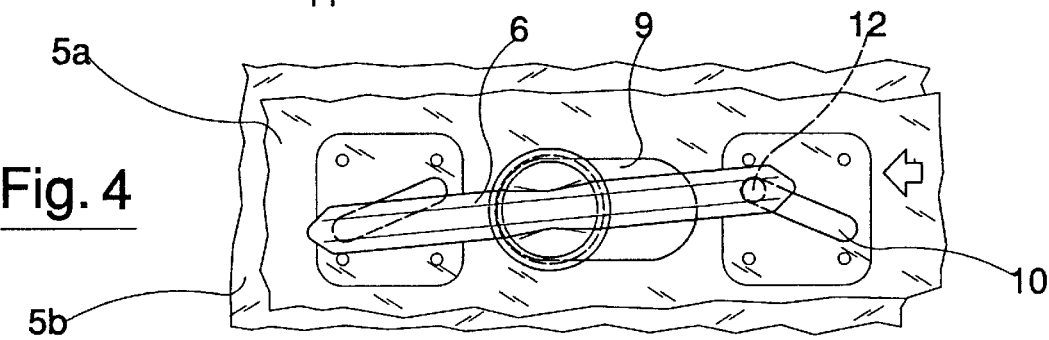
FIGS. 4, 5 and 6 shows a schematic view from above, in enlarged scale, of various positions assumed by a blade following a relative translation between the jackets of the rotor.
Figure 5:
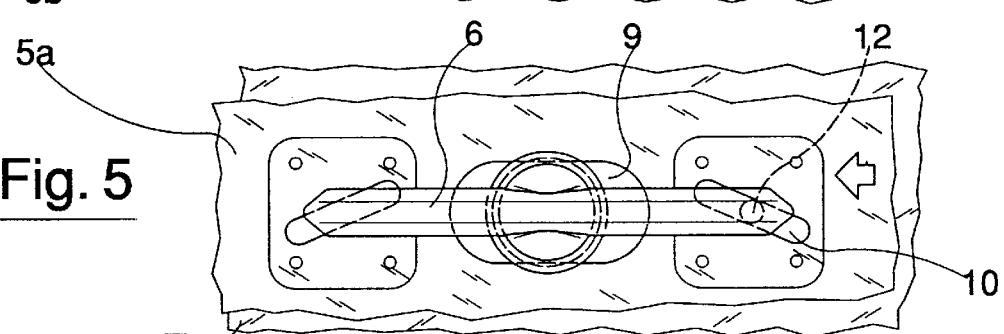
Figure 6:
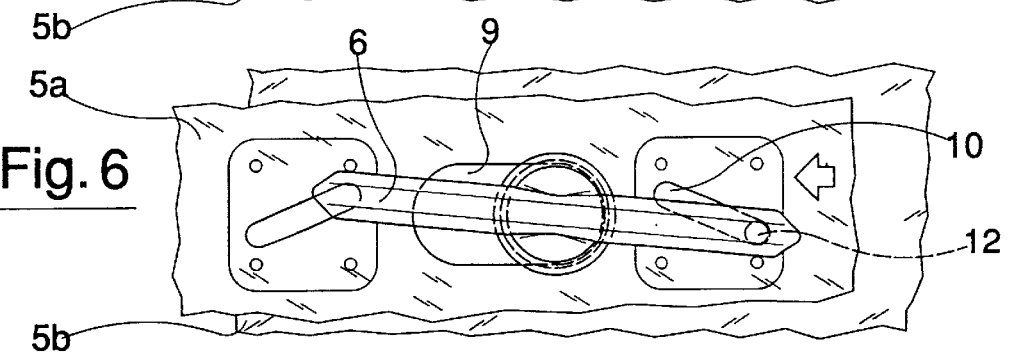

In FIGS. 4, 5 and 6 the limit orientation positions of the spatulas are illustrated by way of example. The spatulas can be oriented towards the right or the left, according to the translation run of the external jacket 6a with respect to the internal jacket 6b. In the illustrated example, the guide 10 is conformed such as to cause rotations of the spatula which change the rotation direction (right- or left-wise) of the angle of the spatula with respect to the axial direction of the rotor.

By providing the external jacket 6a of the rotor 5 with guides 10 arranged both anteriorly and posteriorly of the relative through-holes 11 and slots 9 pairs, it is possible by a simple sliding of the guide pivots 12 from the left end to the right end of the spatula 6, to have two different variations in the orientation of each spatula. Further, if the guides 10 are made on removable parts of the external jacket 5a, for example on plates screwed to the jacket 5a or on substitutable peripheral strips having several slots, it will be very easy to change the variations in orientation of the various spatulas 6, making the food refiner adaptable to a universal range of use. Often it is preferable, however, to provide one or more switchable external jackets 5a, each having a different arrangement and conformation of guides 10, while suggesting the best use for each external jacket to the user, who will then learn to use one or other of the jackets for the various specific tasks about to be carried out and the produce to be processed.

Further, by rotating the spatulas 6 by 180° and moving the guide pivot 12 from one end to the other of the spatula, the other external edge of the spatula can be used when the first has become worn. The spatula edges can be provided with inserts or can be specially toughened during manufacture to retard wear. A further characteristic offered by the food refiner of the invention is the division of the sieve 2 into two parts 2 and 2a, and by the perfect similarity between the two parts, which makes it possible to reverse the order of the two parts and further rationalise wear on the various parts of the sieve 2.

All the variations of orientation of the spatulas of the above-described food refiner are done while the food refiner is not in operation, though it would not be impossible to set up means for relative translation between the jackets of the rotor (for example a motorized system arranged at a side of the rotor) for effecting the translation while the food refiner is functioning. This would enable an immediate change in the orientation of the spatulas and a view of the effects of the change on the product quality and on the state of the waste product.

What is claimed is:

1. A variable-trim food refiner, of a type comprising: a sieve, provided with an inlet for a produce to be processed and an outlet for a waste product, at a centre of which a rotor extends from the inlet to the outlet, the rotor being rotatable on command and bearing a plurality of spatulas, an end of each spatula of the plurality of spatulas being very close to an internal surface of the sieve; a casing, which surrounds the sieve and which is provided with an outlet mouth for extracted product; wherein the spatulas are movable with respect to an axial direction of the rotor and rotatable on a radially directed axis of the spatulas with respect to an axial direction plane of the rotor.

2. The food refined of claim 1, wherein the plurality of spatulas can be contemporaneously oriented.

3. The food refiner of claim 1, wherein each spatula of the plurality of spatulas exhibits an axis of symmetry which is represented by an axis about which an orientation of each spatula is performed.

4. The food refiner of claim 1, wherein the plurality of spatulas are orientable contemporaneously and with various orientations for each spatula of the plurality of spatulas.

5. The food refiner of claim 1, wherein: the rotor comprises an external jacket exhibiting a plurality of slots and a plurality of guide holes, and an internal jacket which is solid in rotation with the external jacket and which is provided with a plurality of through-holes, each of which plurality of through-holes is located at a position corresponding to a position of a slot; the external jacket and the internal jacket being able, on command, to make relative axial translations; each spatula of the plurality of spatulas comprising, at an end thereof connected to the rotor, a rotation pivot inserted in a slot of the plurality of slots and fixed rotatably idle in an underlying through-hole of the plurality of through-holes; each spatula of the plurality of spatulas further comprising a guide pivot which is fixed with respect to the spatula of the plurality of spatulas and which inserts slidingly into a guide hole of the plurality of guide holes and can be guided thereby; further comprising means for commandably causing an axial relative translation of the internal jacket and the external jacket of the rotor.

6. The food refiner of claim 5, wherein at least some of the plurality of guide holes are made in removable parts of the external jacket.

7. The food refiner of claim 5, wherein the plurality of guide holes are of varied shape and are arranged on the external jacket and have varying lies.

8. The food refiner of claim 5, wherein each spatula of the plurality of spatulas comprises at least one hole, made at a lateral end of each spatula and having an axis facing the rotor, which at least one hole removably houses an end of the guide pivot, another end of the guide pivot projecting from the each spatula of the plurality of spatulas in a direction facing the rotor.

9. The food refined of claim 1, wherein the sieve is sub-divided into two parts, which two parts are identical one to another.

10. A variable-trim food refiner, of a type comprising: a sieve, provided with an inlet for a produce to be processed and an outlet for a waste product, at a centre of which a rotor extends from the inlet to the outlet, the rotor being rotatable on command and bearing a plurality of spatulas, an end of each spatula of the plurality of spatulas being very close to an internal surface of the sieve; a casing, which surrounds the sieve and which is provided with an outlet mouth for extracted product; wherein the spatulas are orientable with respect to an axial direction of the rotor;

wherein the rotor comprises an external jacket exhibiting a plurality of slots and a plurality of guide holes, and an internal jacket which is solid in rotation with the external jacket and which is provided with a plurality of through-holes, each of which plurality of through-holes is located at a position corresponding to a position of a slot; the external jacket and the internal jacket being able, on command, to make relative axial translations; each spatula of the plurality of spatulas comprising, at an end thereof connected to the rotor, a rotation pivot inserted in a slot of the plurality of slots and fixed rotatably idle in an underlying through-hole of the plurality of through-holes; each spatula of the plurality of spatulas further comprising a guide pivot which is fixed with respect to the spatula of the plurality of spatulas and which inserts slidingly into a guide hole of the plurality of guide holes and can be guided thereby;

further comprising means for commandably causing an axial relative translation of the internal jacket and the external jacket of the rotor.

11. The food refined of claim 10, wherein the plurality of spatulas can be contemporaneously oriented.

12. The food refiner of claim 10, wherein each spatula of the plurality of spatulas exhibits an axis of symmetry which is represented by an axis about which an orientation of each spatula is performed.

13. The food refiner of claim 10, wherein the plurality of spatulas are orientable contemporaneously and with various orientations for each spatula of the plurality of spatulas.

14. The food refiner of claim 10, wherein at least some of the plurality of guide holes are made in removable parts of the external jacket.

15. The food refiner of claim 10, wherein the plurality of guide holes are of varied shape and are arranged on the external jacket and have varying lies.

16. The food refiner of claim 10, wherein each spatula of the plurality of spatulas comprises at least one hole, made at a lateral end of each spatula and having an axis facing the rotor, which at least one hole removably houses an end of the guide pivot, another end of the guide pivot projecting from the each spatula of the plurality of spatulas in a direction facing the rotor.

17. The food refiner of claim 10, wherein at least some of the plurality of guide holes are conformed to cause a rotation of a relative spatula of the plurality of spatulas to change a direction of rotation of an angle of the spatula of the plurality of spatulas with respect to an axial direction plane of the rotor.

18. The food refined of claim 10, wherein the sieve is sub-divided into two parts, which two parts are identical one to another.

* * * * *